June 1, 1943.  C. P. MURPHY  2,320,828
ANIMAL FEEDING APPARATUS
Filed Aug. 29, 1940
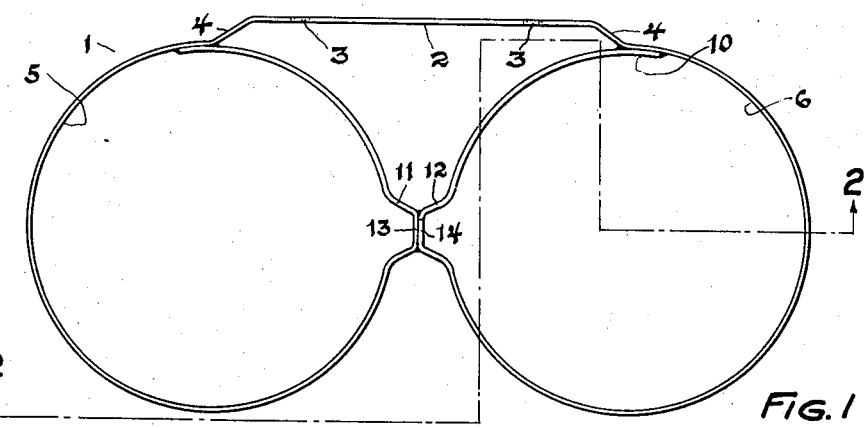
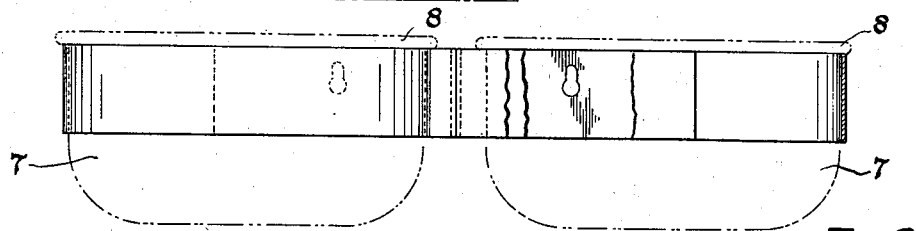
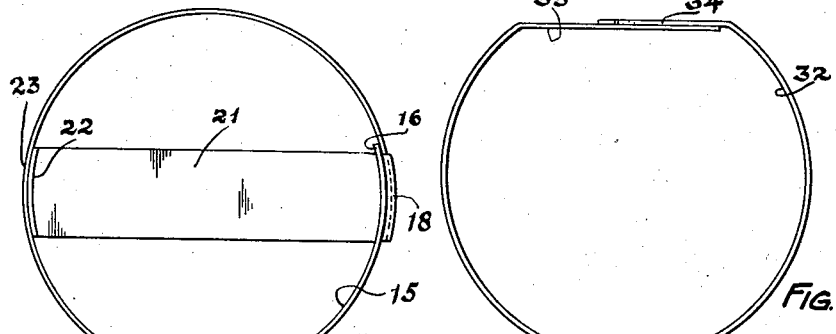
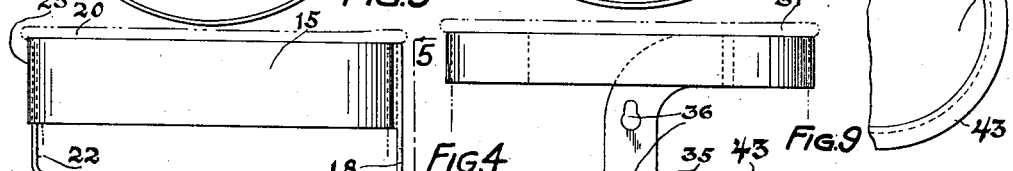
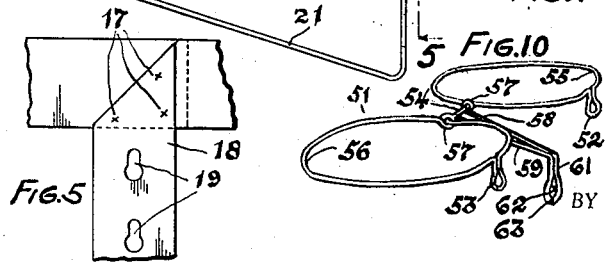
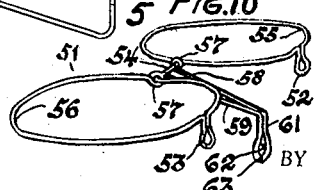
INVENTOR.
Charles P. Murphy,
BY Saywell & Wesseler
ATTORNEYS.

Patented June 1, 1943

2,320,828

UNITED STATES PATENT OFFICE 2,320,828

ANIMAL FEEDING APPARATUS

Charles P. Murphy, Cleveland, Ohio

Application August 29, 1940, Serial No. 354,732

4 Claims. (Cl. 211—88)

This invention, as indicated, relates to an animal feeding apparatus. More particularly, it comprises a structure adapted to be secured to a vertical wall surface or support adjacent the floor level at a suitable distance for easy access thereto on the part of the animals to be fed from such apparatus. The apparatus is designed to have one or more portions thereof removable for cleansing, or for arrangement of the food, and at the same time is designed to prevent dislodgment of the apparatus by the animal being fed and thus causing food particles to be strewn about and wasted.

The principal object of the present invention is to provide an apparatus providing a permanent feeding place for the animals to be fed and having such apparatus readily installed and temporarily or permanently removed, as may be required.

Another object of the invention is to provide an apparatus adapted to be fastened to the lower wall surface or baseboard of a room and support one or more receptacles for food at a low level affording easy access thereto for the animal to be fed.

Another object of the invention is to provide one or more receptacles and supporting means therefor, from which animals may be fed, such receptacles being readily installed, or removed from feeding position, and being held with sufficient firmness during use to prevent accidental dislodgment.

Another object of the invention is to provide a supporting frame work being formed of metal stock with a minimum of joints and connections and providing a firm support for the receptacles.

Other and further objects of the invention will be disclosed in the course of the following description.

To the accomplishment of the foregoing and related ends, said invention, then, consists of the means hereinafter fully described and particularly pointed out in the claims, the annexed drawing and the following description setting forth in detail certain structures embodying the invention, such disclosed means constituting, however, but several of various forms in which the principle of the invention may be used.

In said annexed drawing:

Fig. 1 is a perspective view of a supporting frame adapted to receive a pair of receptacles to provide an apparatus embodying the principles of the invention;

Fig. 2 is a side elevation partly in section taken along the line 2—2 shown in Fig. 1 looking in the direction of the arrows, and showing the receptacles in dotted lines;

Fig. 3 is a top plan view of a supporting frame for a single receptacle;

Fig. 4 is a side elevation of the structure shown in Fig. 3;

Fig. 5 is a fragmentary rear elevation of the structure shown in Fig. 4 as seen along the line 5—5 looking in the direction of the arrows;

Fig. 6 is a top plan view of a modified form of a single receptacle support;

Fig. 7 is a front elevation of the structure shown in Fig. 6;

Fig. 8 is a front elevation partly in section of a combined supporting receptacle;

Fig. 9 is a fragmentary top plan view of the structure shown in Fig. 8; and

Fig. 10 is a perspective view showing a modified form of device embodying the principles of the invention, the frame being formed of wire instead of from flat metal strips.

As shown in Figures 1 and 2 the preferred form of the invention comprises a supporting frame 1 formed of strip metal offset to provide a rearward section 2 as a straight horizontal portion provided with keyhole apertures 3 to engage over suitable fastening elements, such as screw heads in properly spaced relation secured to a wall or baseboard adjacent the floor level. The offset is provided by inclined portions 4 of the strip, the free ends of which are bent inwardly to provide substantially circular openings 5, 6, within which suitable receptacles 7 having outwardly projecting rims 8 may be engaged. The free ends of the strip 9, 10, are secured to the body of the strip at points slightly outwardly of the inclined portions 4 heretofore referred to. The ends are preferably welded at such points, but may be secured by other suitable fastening elements, such as rivets or the like. The circular openings 5, 6, are preferably spaced from each other a sufficient distance to prevent interference of the rims of the receptacle with adjacent parts. Such spacings may be brought about by providing offsets 11, 12, centrally of their respective inner side portions and securing the contacting portions of such offsets 13, 14, to each other by welding, riveting, or any other suitable manner. The dishes 7, 8, may be formed of glassware, crockery, rubber, plastic material or the like, being preferably of a character to be readily cleansed and adapted for rough handling without breaking. The receptacles may be variously shaped, with a deep or shallow portion, and may be circular in cross-section, or have flattened rearward faces, or be otherwise modified, as will be presently described.

The supporting member shown in Figures 3, 4 and 5 is formed of a single sheet of strip metal bent to circular form to provide a circular opening 15. The free end 16 of the support is preferably welded or otherwise secured at the rearward portion of the device by a plurality of spot-welds 17 which hold such free end and also hold a downwardly turned portion of the strip 18 which is provided with suitable keyhole apertures 19 at an intermediate point thereof for engagement over headed studs or the like secured to the wall or baseboard at a suitable distance from the floor level. The rearward portion of the strip is bent upwardly so as to provide an inclined supporting element serving as a brace for the forward portion of the support. In order to provide for a receptacle 20 of suitable depth, the inclined supporting member 21 is joined with a vertical portion 22 which preferably engages within the circular opening 15 and is secured to the front portion of the strip 23 by welding, riveting or otherwise fastening the same.

In the form of construction shown in Figures 6 and 7 no bracing member of the type shown in Figures 3 to 5 is provided, the strip metal being of sufficiently heavy gauge to support the receptacle firmly without the assistance of a bracing element. Such construction can be formed of irregular outline to conform to any desired shape of receptacle, but in the form illustrated the receptacle 31 is flattened at its rearward face, and the metal strip is bent to provide an opening 32 of substantially circular outline at its side and forward portion, having a flat portion 33 at its rearward portion. This flat portion may overlap the body portion of the strip 34 to which it is secured by welding, riveting or the like. The body portion 34 is turned downwardly to provide a vertical supporting member 35 having a plurality of keyhole slots 36, or other suitable fastening apertures whereby it may be engaged in firm relation with a wall baseboard or the like adjacent the floor level where the animal is to be fed.

For certain kinds of animals it is unnecessary to have rigid supporting frames for the receptacle, and in such cases the receptacle 40 may be formed with a flat rearward wall 41 within which suitable apertures 42, preferably of keyhole shape, are provided. The projecting rim 43 may be provided about the margins of the receptacle at its side and forward portions which may be suitably curved to present an artistic appearance. The keyhole slots permit the receptacle to be secured directly to headed studs or other fastening elements on the wall or baseboard of the supporting member. The receptacles, when made of plastic of suitable composition, will be found to be practically unbreakable and light in weight and of suitable character for ready cleansing.

In the form of construction shown in Fig. 10, the frame is formed of wire instead of from flat metal strips. It is to be understood that wire may also be used in connection with the other forms of structures illustrated, where no special function of the flat metal is in view. In general, it is preferred to use flat strip metal as being more substantial and rigid and as adapted for ornamental or decorative effects. However, for certain sizes and installations the use of wire is preferable, particularly where a degree of resiliency is of advantage. The use of wire may also involve economy of manufacture, since a single length of wire with but a single fastening at the ends, such as a welded joint, may provide a continuous integral structure throughout.

The frame 51 may be made of one piece or several pieces welded as required. In the form shown in Fig. 10, a single piece of wire is employed. In forming this structure the supports 52, 53, are first formed at suitably spaced apart positions, and thereafter the spacing section 54 is formed with the bowl openings 55, 56, provided by circular shaping of each portion, the circles when completed being fixed as to size by winding the free ends of the wire around the central spacing section 54 for a single loop 57 on each length respectively, and thence carrying such ends downwardly to provide angular sections 58, 59, meeting each other at a shallow transverse angle and being bent vertically downward to provide a vertical section 61 to contact the baseboard and provide a keyhole aperture 62 at the extreme ends of the wire section, which may be joined by a weld 63.

Other modes of applying the principle of my invention may be employed instead of those explained, change being made as regards the structure herein disclosed, provided the means stated by any of the following claims or the equivalent of such stated means be employed.

I therefore particularly point out and distinctly claim as my invention:

1. A device of the character described having in combination a frame formed of a single continuous length of metal stock of uniform width, with at least one rearward portion adapted to be secured to a vertical member, another portion forming a supporting frame provided with a pair of loops formed integrally with said rearward portion and with a spacing member centrally between the same, each loop with the rearward portion adapted to support a receptacle, said supporting frame having cantilever action against said vertical member to hold said frame in substantially horizontal position and support said receptacle at a convenient animal feeding level.

2. A supporting member for animal feeding receptacles comprising an elongated portion of metal stock having the body portion thereof bent to provide spaced substantially circular loops for receptacles and a support-engaging member on the rear of the body portion for securing the same in substantially horizontal position to a vertical supporting member, and means connecting adjacent central portions of said loops for spacing said circular loops from each other a distance to prevent interference of adjacent receptacles positioned within said loops for animal feeding purposes.

3. A supporting member for animal feeding receptacles comprising an elongated section of wire bent to form downwardly projecting members at spaced positions on each side of its center to provide openings for fastening elements to be engaged therewith, and having a short spacing section formed at the central portion of said length of wire and circular portions formed at each end thereof of a size to receive animal feeding receptacles, such circular openings being fixed in size through the engagement of said wire lengths around said spacing portion, such lengths continuing at an angle downwardly and then vertically downwardly and forming an opening to receive a separate fastening element.

4. A supporting member for animal feeding receptacles comprising an elongated section of wire bent to form downwardly projecting members at spaced positions on each side of its center to provide openings for fastening elements to be engaged therewith, and having a short spacing section formed at the central portion of said length of wire and circular portions formed at each end thereof of a size to receive animal feeding receptacles, such circular openings being fixed in size through the engagement of said wire lengths around said spacing portion, such lengths continuing at an angle downwardly and then vertically downwardly and forming an opening to receive a separate fastening element, the free ends of said length of wire being integrally joined to each other and each of the openings in such length of wire being formed of keyhole shape to detachably engage over fastening means secured to a vertical member at a convenient animal feeding level.

CHARLES P. MURPHY.